United States Patent [19]

Hiranuma

[11] Patent Number: 4,535,437
[45] Date of Patent: Aug. 13, 1985

[54] PICKUP ARM DRIVING CONTROL SYSTEM WITH REPEAT PLAYBACK FUNCTION

[75] Inventor: Satoshi Hiranuma, Tokyo, Japan

[73] Assignee: Trio Kabushiki Kaisha, Tokyo, Japan

[21] Appl. No.: 450,296

[22] Filed: Dec. 16, 1982

[30] Foreign Application Priority Data

Dec. 25, 1981 [JP] Japan .................................. 56-209285

[51] Int. Cl.³ .................. G11B 3/36; G11B 19/14; G11B 17/06
[52] U.S. Cl. ................................... 369/223; 369/41; 369/216; 369/219; 369/221
[58] Field of Search ............... 369/219, 223, 224, 215, 369/221, 41, 216

[56] References Cited

U.S. PATENT DOCUMENTS

| | | | |
|---|---|---|---|
| 4,222,574 | 9/1980 | Cheeseboro | 369/224 |
| 4,260,162 | 4/1981 | Morii et al. | 369/41 |
| 4,301,526 | 11/1981 | Morii et al. | 369/41 |
| 4,307,418 | 12/1981 | Mindel et al. | 369/41 |
| 4,323,997 | 4/1982 | Kuribayashi et al. | 369/41 |
| 4,423,503 | 12/1983 | Cheeseboro | 396/290 |
| 4,426,692 | 1/1984 | Hirata | 369/41 |

FOREIGN PATENT DOCUMENTS 3255380 3/1980 Japan .

Primary Examiner—Steven L. Stephan
Attorney, Agent, or Firm—Murray, Whisenhunt & Ferguson

[57] ABSTRACT

A pickup arm driving control system in record disc players with repeat playback function. The driving control system can drive the manipulation of a tone arm in such a manner that only an optionally selected portion is repeatedly reproduced. The system includes an encoder for producing an output pulse at every predetermined step of the moving of the tone arm, a circuit for calculating the moving distance of the tone arm from an arm rest position by accumulating the output pulses, an operation switch for generating setting signals in response to manual operations conducted when the tone arm is just tracking the starting and end positions of a repeat playback part of the loaded record disc, a memory for storing the up-dated one of the calculated result of moving distance as a first memory value, the first memory values upon the generation of the setting signals as a second and third memory values, and a circuit for in response to the coincidences between the first memory value and the second or third memory value controlling the manipulation of the tone arm.

1 Claim, 5 Drawing Figures

FIG. 1
FIG. 3
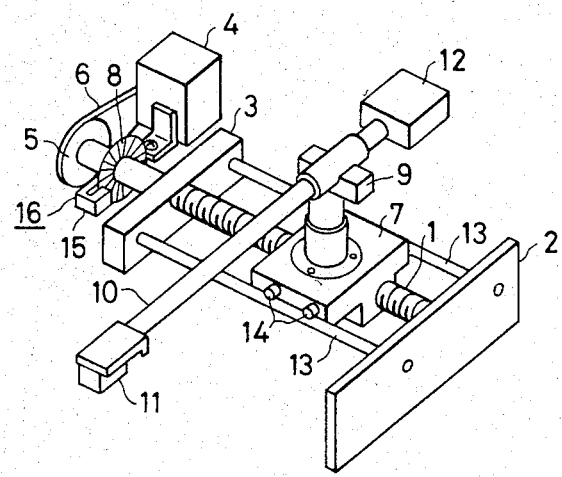
| FIG. 3A |
| FIG. 3B |
FIG. 2
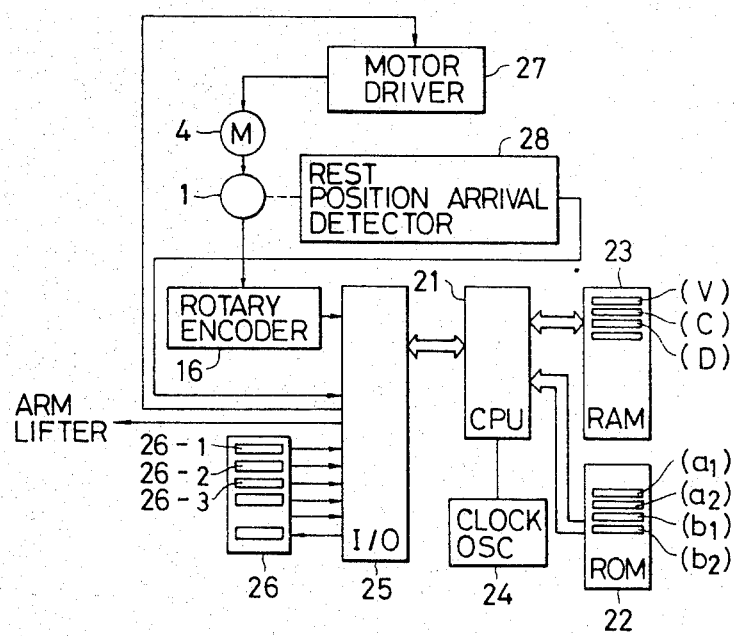

PICKUP ARM DRIVING CONTROL SYSTEM WITH REPEAT PLAYBACK FUNCTION

BACKGROUND OF THE INVENTION

1. Field of the Invention

This invention relates in general to pickup arm driving apparatus and, more particularly, to a pickup arm driving control system in record disc players with repeat playback function.

2. Description of the Prior Art

Auto-repeat record players which can automatically repeat the playback operation are known in the prior art. Conventionally, auto-repeat players repeatedly play back the full recorded surface on one side of a record disc. That is, it has been impossible in such record disc players to repeatedly play back an optionally selected part of the loaded record disc. While, there will be an occasion where an user requires to play back only a part of a loaded record disc recording some music or information to which he like to listen. Any heretofore known auto-repeat record disc player could not meet such user's requirement.

SUMMARY OF THE INVENTION

Accordingly, it is an object of the present invention to provide a novel pickup arm driving control system in record disc players capable of repeatedly playing back a part of a loaded record disc set or directed by an user without using recording-break portion detecting sensors or the like.

In accordance with the above object, the present invention is addressed to a pickup arm driving control system which comprises means for producing an output signal at every predetermined step of the moving of a tone arm, means for calculating the moving distance of the tone arm from a reference position at every output signal by accumulating said output signals, means for generating a first setting signal in response to a manual operation conducted when the tone arm is just tracking the start position of a part of the loaded record disc where an user wants repeat playback operation and a second setting signal in response to another manual operation conducted when the tone arm is just tracking the end position of the above mentioned repeat playback part of the loaded record, a memory unit for successively storing the up-dated one of the calculated result of moving distance as a first memory value at a first address, the first memory value upon the generation of the first setting signal as a second memory value at a second address and the first memory value upon the generation of the second setting signal as a third memory value at a third address, means for generating a first coincidence signal when the first memory value coincides with the second memory value during the repeat playback operation mode and a second coincidence signal when the first memory value coincides with the third memory value while the repeat reproduction for the above mentioned part of the record disc is being executed, and means for in response to the first and second coincidence signals controlling the manipulation of the tone arm so that the repeat reproduction may begin from the start position determined by the generation of the first setting signal and terminate at the end position determined by the generation of the second setting signal.

BRIEF DESCRIPTION OF THE DRAWINGS

For a fuller understanding of the nature and objects of the invention, reference should be had to the following detailed description taken in connection with the accompanying drawing wherein:

FIG. 1 is a perspective view of a linear tracking arm assembly applicable to the present invention.

FIG. 2 is a block diagram showing a pickup arm driving control system embodying the present invention.

DETAILED DESCRIPTION OF THE INVENTION

Figure 3A:
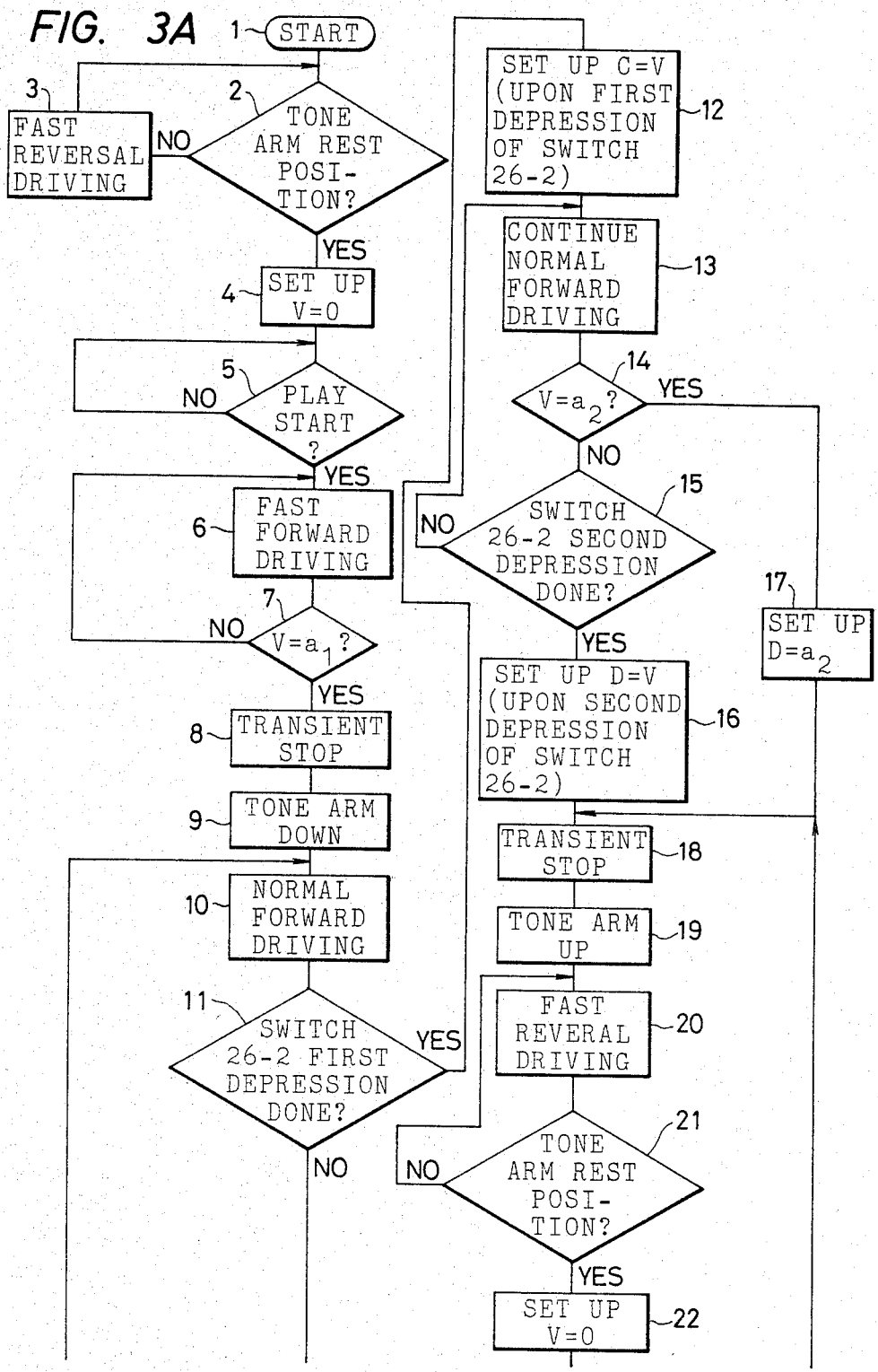
FIG. 3 consisting of FIG. 3A
FIG. 3B is a flow chart showing the logic operation sequence of the system of FIG. 2.

There is shown in FIG. 1 of the drawings main part of a linear tracking pickup arm mechanical assembly which is applicable to a pickup arm driving control system according to the present invention. Worm gear 1 with a horizontal center axis is mounted across mounting plates 2 and 3 in such a manner as to freely rotate about the horizontal center axis. Reversible motor 4 drives worm gear 1 in a forward or reversal rotation through pulley 5 and belt 6. Sliding table 7 is engaged with worm gear 1 so as to slide along worm gear 1 rotates and disc-like rotator plate 8 is fixed to the end portion of worm gear 1 so as to rotate together with the rotation of worm gear 1. Tone arm 10 is pivotally mounted on arm holder 9, which is secured to sliding table 7, so as to be freely turned in vertical planes making a right angle with the horizontal center axis of worm gear 1. An arm lifter (not shown in the drawing) pivotally turns tone arm 10 by a predetermined angle in a clockwise or counterclockwise. On one end of tone arm 10 is provided pickup cartride 11 and on the other end of tone arm 10 balancing weight 12. Guide rails 13 crossing from plate 2 to plate 3 guide sliding table 7 through rollers 14 projecting out of table 7. And also, mounting plate 2 is provided with rest position detecting means (not shown in the drawings), for example limit switch, which detects that tone arm 10 reaches the arm rest position and in response to the detection produces an output signal. In rotator plate 8, a plurality of slits are radially formed. As a photocoupler a light emitting element and a photodetecting element are positioned at the opposite sides of rotator plate 8. Rotator plate 8 and photocoupler 15 constitute rotary encoder 16 which produces output pulses, the number of which is proportional to the number of rotations of rotator plate 8. The rotation of reversible motor 4 in a forward mode causes sliding table 7 and tone arm 10 to travel toward mounting plate 3 and the rotation of motor 4 in a reversal mode causes sliding table 7 and tone arm 10 to travel toward mounting plate 2, that is the arm rest position. When a positive polarity input signal is applied to the afore-mentioned arm lifter, tone arm 10 is driven to pivotally turn in a vertical plate to the position where the stylus point of cartridge 11 abuts with the surface of a loaded record disc. Reversely, the arm lifter in response to the receipt of a negative polarity input signal pivotally turns tone arm 10 to the position where the stylus point lies apart from the surface of the loaded record disc.

System Architecture Description

A pickup arm driving control system embodying the present invention is illustrated in a schematic block diagram of FIG. 2. The illustrated system is arranged to controllably drive the pickup assembly of FIG. 1. Central processor unit (hereinafter referred to as CPU) 21, read only memory (ROM) 22, read and write memory (RAM) 23, clock pulse oscillator 24, input/output interface unit (I/O adaptor) 25 and operation board 26 constitute a microcomputer system. It will be easily understood that CPU 21, ROM 22, RAM 23, oscillator 24 and I/O adaptor 25 can be realized by making use of corresponding parts of one chip microcomputer. ROM 22 previously stores a predetermined program which serves to control the sequence operation of CPU 21, ROM 22, RAM 23 and I/O adaptor 25. As required, CPU 21 fetches this program from ROM 22 and decodes it to generate control signals. ROM 22 also stores data for available record disc sizes, for 30 cm diameter record disc, count $a_1$ of output pulses produced in rotary encoder 16 when tone arm 10 travels from the arm rest position to the position where the stylus point of cartridge 11 lies right above the most outside sound groove of the loaded record disc during the forward driving mode of reversible motor 4 and count $a_2$ of output pulses produced in rotary encoder 16 when tone arm 10 travels from the arm rest position to the position where the stylus point lies right above the most inside sound groove of the disc. As further data of record disc size, counts $b_1$ and $b_2$ as defined in the above for 17 cm diameter record disc also are previously stored in ROM 22.

Operation board 16 are provided with switch 26-1 for designating a record disc size in loading, switch 26-2 for directing the start of repeat operation and the end thereof, switch 26-3 directing play-cut operation and the like. When any one of switches on board 26 is depressed, an output signal associated with the depressed switch is transmitted through I/O adaptor 25 to CPU 21 and a processing directed by the depressed switch is executed. A control signal directing any one of forward rotation, stop or reverse rotation of reversible motor 4 is applied from CPU 21 through I/O adaptor 25 to motor driver 27. The rotation of motor 4 is driven by the output of driver 27 is a forward rotation mode, stop mode or reverse rotation mode. When tone arm 10 reaches the arm rest position, rest position arrival detector 28 produces an output signal which is in turn transmitted through I/O adaptor 25 to CPU 21. CPU 21 generates a signal for directing the turn of tone arm 10 in a vertical plane. This signal is applied through I/O adaptor 25 to the arm lifter.

Reversible motor 4 rotates worm gear 1 through belt 6 and pulley 5. The rotation of worm gear 1 is accompanied with the rotation of rotator plate 8 of rotary encoder 16. Rotary encoder 16 produces output pulses the number of which is proportional to the number of rotations of rotator plate 8. These output pulses are transmitted through I/O adaptor 25 to CPU 21 and counted therein. The count V of these pulses is stored in RAM 23. The count V is up-dated at every output pulses produced by rotary encoder 16. During the interval while reversible motor 4 is rotating under the forward rotation driving signal, the pulses are up-counted. During the interval under the reverse rotation driving signal, the pulses are down-counted. And when tone arm 10 reaches the rest position, CPU 21 in response to the output issued from rest position arrival detector 28 clears count V. Accordingly, count V corresponds to the distance from the tone arm rest position to the existing position of tone arm 10.

RAM 23 stores repeat operation start and end position data at predetermined addresses. When repeat switch 26-2 is depressed in such a manner as to direct the repeat operation start position, count V upon this depression of switch 26-2 (this count is hereinafter referred to as count C) is stored at an address in RAM 23. When repeat switch 26-2 depressed in such as amnner as to direct the repeat operation end position, count V upon this depression of switch 26-2 (this count is hereinafter referred to as count D) is stored at another address in RAM 23. CPU 21 makes a comparison between the current count V and the data count, that is count $a_1$, $a_2$, $b_1$, $b_2$, C or D, at a predetermined timing. According to the comparison resultant, CPU 21 provides moter driver 27, through I/O adapter 25, with a driving signal for directing forward rotation, stop or reverse rotation of reversible motor 4 and provides the arm lifter with a positive or negative polarity signal.

System Operation Description

Figure 3B:
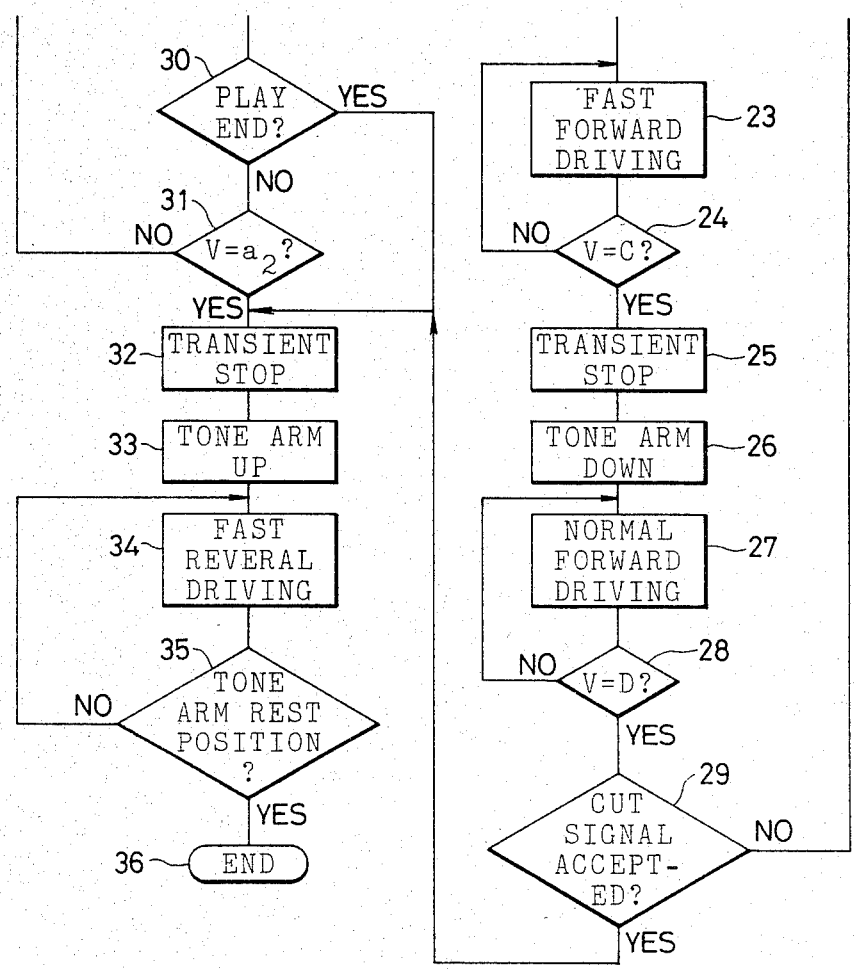

A flow chart showing the logic sequence in the operation of the system arranged as shown in FIG. 2 is presented as FIG. 3. Steps in the sequence of the flow diagram are numbered 1–36 as shown in FIG. 3. The following description will be drawn along the flow in the diagram of FIG. 3.

Steps 1–11 (Playback Start Operation Sequence)

As a power switch is thrown, the microcomputer system enters on a running condition. It is examined as the first step whether or not tone arm 10 presently lies at the arm rest position. If yes, the system proceeds to a condition for waiting for a playback start signal originated by the depression of operation direction switch 26-3. If not, CPU 21 provides motor driver 27 with a reverse rotation driving signal so that the reverse rotation of motor 4 may move tone arm 10 to the arm rest position in a fast reversal driving mode. In response to the detection that tone arm 10 lies at the rest position, counts V, C and D in RAM 23 are cleared. As operation direction switch 26-3 generates the playback start signal, CPU 21 in response to the receipt of this signal provides motor driver 27 with a fast forward driving signal to drive motor 4 in a fast forward rotation mode so that tone arm 10 may move toward the center of a record disc (this moving direction is hereinafter referred to as forward direction) in a fast driving mode. Rotary encoder 16 generates output pulses as worm gear 1 rotates during the rotation of motor 4. These pulses are received by CPU 21 and counted therein. The count V is stored in RAM 23 and incrementedly up-dated at every pulse generated by rotary encoder 16. At every increment of count V, the current count V is compared with count $a_1$ or $b_1$ stored in ROM 22 according to the size of the loaded record disc. The record disc size has been designated by switch 26-1 before the user directs the start of playback. In the flow chart, the record disc size is designated as 30 cm diameter. Thus, CPU 21 can access an appropriate count data, in this case count $a_1$, stored in ROM 22 according to the disc size designation. Disc size designation switch 26-1 can be replaced with for example an optical sensor mounted on tone arm 10 for detecting the outside peripheral edge of a loaded record disc. With this sensor, the size of a record disc loaded in the player can be determined by the count V at an instant when the optical sensor detects the outside peripheral edge of the record disc during the fast forward driving of tone arm 10.

When count V coincides with count $a_1$ during the fast forward-driving of tone arm 10, CPU 21 learns it from this coincidence that tone arm 10 reaches the position right above the most outside sound groove of the loaded record disc. At this instant, CPU 21 generates a stop signal to be applied to motor driver 27 to transiently stop motor 4 and also a positive polarity signal to be applied to the arm lifter. Then CPU 21 provides motor driver 27 with a normal forward driving signal. Accordingly, tone arm 10 transiently stops at the position where count V=count $a_1$. The arm lifter turns tone arm 10 so that the stylus point of cartridge 11 is put down on the record disc. After that, tone arm 10 is moved in the forward direction at a normal speed, with the stylus point of cartridge 11 abutting on the record disc. Now, the recorded information in the record disc is sequentially reproduced from the most outside sound groove. While tone arm 10 is being moved, rotary encoder 16 keeps generating output pulses. CPU 21 increments count V at every pulse. During the forward driving of tone arm 10, CPU 21 executes a comparison at every increment of count V to examine whether the current count V coincides with count $a_2$ stored in ROM 22 and with counts C and D stored in RAM 23. On the way of playback, when tone arm 10 reaches the start position of a part at which the user wants repeat playback, repeat switch 26-2 is depressed by the user.

Steps 12-29 (Repeat Playback Operation Sequence)

CPU 21 in response to an output signal produced by this first time depression stores at a predetermined address in RAM 23 count V upon the depression of repeat switch 26-2 as a start position data of repeat playback operation. As aforementioned, this count V is referred to as count C. Irrespective of the above repeat playback start position setting, the moving of tone arm 10 is kept and the reproduction continuously goes forward. Subsequently, when tone arm 10 reaches the end position at which the user requires to terminate the repeat playback operation, repeat switch 26-2 is depressed once again. CPU 21 in response to the second time depression on switch 26-2 stores at another address in RAM 23 count V upon the second time depression of switch 26-2, which is referred to as count D. At the same time of setting up the end position of repeat playback operation in the above manner, CPU 21 provides motor driver 27 with a stop signal to stop reversible motor 4. Successively, CPU 21 provides the arm lifter with a negative polarity signal to lift up tone arm 10 and also drives it at a fast speed through the fast reverse rotation of motor 4 so that tone arm 10 is moved toward the outside of the record disc (this direction is referred to as a reversal direction). CPU 21 decrements count V at every pulse generated from rotary encoder 16 during the reversal driving of tone arm 10. When tone arm 10 returns to the rest position, CPU 21 in response to the output signal produced by reset position arrival detector 28 rotates through motor driver 27 reversible motor 4 in the fast forward rotation mode. CPU 21 clears count V upon the situation of tone arm 10 at the rest position and in turn increments it at every pulse from rotary encoder 16 as tone arm 10 travels in the forward direction again. It will be understood that the above clearance of count V can be omitted from the operation sequence in case that count V decrements to zero when tone arm 10 arrives at the rest position.

During the fast forward moving of tone arm 10, when the incremented count V coincides with count C stored in RAM 23 as the start position data of repeat playback operation, CPU 21 in response to this coincidence provides motor driver 27 with a stop signal and also the arm lifter with a positive polarity signal. Subsequently, CPU 21 provides motor driver 27 with a normal forward driving signal. As a result of the control by CPU 21, tone arm 10 transiently stops at the position where count V=count C, that is the start position of repeat playback operation, pivotally turns on arm holder 9 so that the stylus point of cartridge 11 may be put down on the record disc and then moves in the forward direction at the normal speed. Hereafter, the reproduction begins from the repeat playback start point set up through the first time depression of switch 26-2. On the way of this repeat playback, when count V coincides with count D stored in RAM 23 as the end position data of repeat playback operation, CPU 21 in response to this coincidence provides motor driver 27 with a stop signal to stop motor 4 at the end of repeat playback operation directed by the second time depression of repeat switch 26-2, the arm lifter with a negative polarity signal to lift up tone arm 10 so that the stylus point of cartridge 11 may lie apart from the record disc and then motor driver 27 with a fast reverse rotation signal to rotate motor 4 in a fast reversal mode so that tone arm 10 may be driven to the arm rest position. The next operation after tone arm 10 has arrived at the rest position returns to the starting step of repeat playback sequence. In this manner, the reproduction only for the selected part of a record disc is repeated. If the user want to stop the executing playback after step 28, he will depress operation direction switch 26-3 to generate an output signal which is interpreted as a cut signal in CPU 21 according to the program stored in ROM 22. In response to the cut signal, the operation sequence deviates from the repeat playback operation loop and goes to step 32 from step 29. Accordingly, tone arm 10 returns to the arm rest position.

Provided that during the playback operation the second time depression of repeat switch 26-2 has not been made until tone arm 10 reaches the most inside sound groove of the loaded record disc, CPU 21 will detect the coincidence between count V and count $a_2$. In this case, the operation sequence branches at step 14 and goes to step 17. CPU 21 stores count 92 at a predetermined address in RAM 23 as count D to set up D=$a_2$. After that, the branch returns to the stem sequence at step 18. This operation is the same manner as a case where the second time depression of repeat switch 26-2 is made when count V reaches count $a_2$. Accordingly, if the second time depression of repeat switch 26-2 is not made during the playback, the repeat playback operation will be executed in a range from the starting position directed by the first depression of repeat switch 26-2 to the end of recording in the loaded record disc.

Steps 30-36 (Playback End Operation Sequence)

After starting the playback operation, where the first time depression of repeat switch 26-2 is not made, tone arm 10 continues moving to the end position of the loaded record disc without any transient stop. CPU 21 will detect the coincidence between count V and count $a_2$ at the end position of the loaded record disc. CPU 21 in response to this detection stops reversible motor 4, lifts up tone arm 10 and return it to the arm rest position in a fast reversal driving. When motor 4 arrives at the arm rest position, count V is cleared. CPU 21 becomes a condition of waiting for a signal produced by operation direction switch 26-3. Thus, the repeat playback operation is not executed and the full one side of a record disc is reproduced.

Cut Operation

When a cut signal is originated by the depression of operation direction switch 26-3, CPU 21 in response to the receipt of the cut signal during the fast forward driving mode and the normal forward driving mode provides motor driver 27 with a stop signal, the arm lifter with a negative polarity signal and subsequently motor driver 27 with a fast reversal driving signal. Thus, tone arm 10 transiently stops, pivotally turns to the position where the stylus point of cartridge 11 can lie apart from the record disc and travels toward the arm rest position in the fast reversal driving mode. When tone arm 10 reaches the arm rest position, rest position detection device 28 generates an output signal. CPU 21 in response to the receipt of this signal stops motor 4 and becomes a condition of waiting for a signal from operation board 26.

Whenever the cut signal is generated, CPU 21 accepts it except the operation stages where tone arm 10 is placed at the rest position or is moved toward the rest position in the fast reversal driving mode. The executing program is interrupted by the cut signal and the program following the interrupt is an instruction sequence which performs the return of tone arm 10 from the current position to the rest position. On the flow chart of FIG. 3, the cut signal acceptance is illustrated only at step 26. It, however, should be noted that the cut signal can be accepted as an interrupt signal with the first priority during any operation except the fast reversal driving of tone arm 10.

In the foregoing repeat playback operation, it is required that tone arm 10 returns from the repeat playback end position to the arm rest position before the next repeat operation and then travels to the repeat playback start position. Instead of such a return manipulation of tone arm 10, CPU 21 can stop motor 4 when count V coincides with count C during the reverse driving of tone arm 10 toward the outside of the record disc. Subsequently, CPU 21 puts down cartridge 11 on the record disc at the stop position and starts the next repeat reproduction. Since count V decrements at every output pulses of rotary encoder 16 during the fast reverse driving of tone arm 10, tone arm 10 is correctly placed at the start position of repeat reproduction without returning arm 10 to the arm rest position.

With the above mentioned pickup arm driving control system wherein tone arm positions corresponding to repeat playback start and end positions are memorized during the first time playback through manual operation by an user and then in the next time playback the current tone arm position is compared with the memorized tone arm position data to automatically determine the start and end positions of repeat playback, only the part of a loaded record disc where the user likes the listen is repeatedly reproduced.

As one of the features, the system does not require recording-break portion detecting sensors or the like the execute the above repeat operation.

As another of the features, an user can easily set up any position of a loaded record disc as the start and end positions of repeat playback while he is listening to the reproduced information like music, instead of previously giving a concrete data of repeat playback for the loaded record disc to the system.

A program expressed in assembly language for MUCOM43 series by Nippon Electric Company Ltd., which serves to execute the operation sequence of FIG. 3, is shown in an attached Appendix.

It will be easily understood for those skilled in the art that the present system is applicable the turning tracking arm assemblies as well as linear tracking arm assemblies. Since certain other changes also may be made in the above-described pickup arm driving control system without departing from the scope of the invention herein involved, it is intended that all matter contained in the above description or shown in the acompanying drawings shall be interpreted as illustrative and not in a limiting sense.

APPENDIX

```
R,0,UCOM43

MUCOM-43/44/45   CROSS ASSEMBLER    VER1.1

ASM(43/44/45)= 44

MODE(S/L/E/O)= SLE

IN(L/H/D)= D

UNIT(0-3)= 1

FILE NAME= G-1007

LIST-OUT(L/H)= L
```

| SYM | ADRS | SYM | ADRS | SYM | ADRS | SYM | ADRS |
|---|---|---|---|---|---|---|---|
| AMCT0 | 0325 | AMCUT | 0316 | AT1 | 032C | ATLDI | 0329 |
| AUTO0 | 00CB | AUTO1 | 00D6 | AUTO2 | 00DC | AUTO3 | 00E1 |
| AUTO4 | 00E4 | AUTO5 | 00E6 | AUTO6 | 00EA | AUTO7 | 00F1 |
| C397? | 00A9 | C554? | 00B3 | C578? | 00C0 | C65? | 009F |
| CANCL | 0212 | CIN? | 02CD | CLR | 008D | CLRM | 008C |
| CMPRE | 00BC | COUT? | 02D4 | CT00 | 0308 | CT11 | 030E |
| CU04 | 024F | CUE | 0222 | CUE0 | 0245 | CUE03 | 0251 |
| CUE04 | 024A | CUT0 | 0300 | CUT? | 01C6 | D | 0088 |
| DDR | 037B | DECT | 0008 | DELAY | 035B | DOOR | 0361 |
| DOOR0 | 036E | DOOR1 | 039B | DOOR2 | 03A5 | DOOR3 | 03BF |
| DOOR4 | 03D6 | DOOR5 | 03DC | DOOR6 | 03DF | DOR0 | 037F |
| DOR03 | 03C7 | DOWN | 0087 | DOWN0 | 033C | DR0 | 0393 |
| DR1 | 0392 | DR3 | 03AB | FOR | 01D6 | FOR0 | 01EF |
| FR | 01E0 | GAT1 | 00DE | GCUE | 01DE | GCUE0 | 023B |
| GCUT0 | 029A | GCUT? | 03E6 | GDOOR | 01B2 | GPC0 | 00F3 |
| GREV0 | 01FE | GSCAN | 0271 | GTIMR | 00EF | HSCAN | 03A3 |
| INCT | 0004 | INTL | 003F | INTL0 | 0045 | INTL1 | 004B |
| JSCAN | 033E | KICK | 034A | LSCAN | 0348 | MAIN0 | 006E |
| MAIN1 | 0097 | MEMO | 01A8 | MFS | 0028 | MNFS | 002C |
| MNOS | 0024 | MOS | 0020 | ON | 021B | PACH0 | 014F |
| PACH1 | 0148 | PACH2 | 0164 | PC0 | 0278 | PC1 | 027B |
| PC3 | 027D | PC30 | 0284 | PC4 | 0288 | PC5 | 028D |
| PCH0 | 02EA | PCLR | 01AB | PLAY0 | 029C | PLAY1 | 02C8 |
| PLAY2 | 0273 | PLAY3 | 02C2 | PLAYC | 0256 | PLY00 | 02A9 |
| PLY01 | 02AE | PLY03 | 02B1 | PLY05 | 02BA | PLY30 | 02C1 |
| PLYC0 | 0261 | PLYC1 | 026D | RDOS | 012E | RDOS0 | 0135 |
| REV | 01F1 | REV0 | 0200 | REV1 | 0218 | RPEAT | 019A |
| RPT0 | 01B4 | RSTA | 0128 | RSTB | 0122 | RSTC | 0117 |
| RTURN | 0359 | SCANN | 004F | SFOR | 0080 | SIZE0 | 0173 |
| SIZEE | 016B | SJSCN | 033A | SPED | 017C | SPED0 | 0183 |
| SPED1 | 018D | SREV | 0084 | SSCAN | 005D | SWCHG | 013E |
| SYNC1 | 01CC | SYNCD | 0352 | TABT0 | 0010 | TABT1 | 0014 |
| TABT2 | 0018 | TABT3 | 001C | TCT | 000C | TIM | 0113 |
| TIM0 | 0106 | TIMER | 0100 | TMBT0 | 0030 | TMBT1 | 0034 |
| TMBT2 | 0038 | TMBT3 | 003C | TSCAN | 02BB | U | 0092 |
| UP | 0091 | ZINTL | 0000 | | | | |

MUCOM-44    CROSS ASSEMBLER

```
STNO E ADRS OBJ.      SOURCE STATEMENTS 0001   0000           ORG 0
0002   0000 A03F      ZINTL:JMP INTL
0003   0002 00           NOP
0004   0003 00           NOP
0005   0004 0D        INCT:INC
0006   0005 49           RTS
0007   0006 48           RT
0008   0007 00           NOP
0009   0008 0F        DECT:DEC
0010   0009 49           RTS
0011   000A 48           RT
0012   000B 00           NOP
0013   000C 04        TCT:TC
0014   000D 49           RTS
0015   000E 48           RT
0016   000F 00           NOP
0017   0010 24        TABT0:TAB 0
0018   0011 49           RTS
0019   0012 48           RT
0020   0013 00           NOP
0021   0014 25        TABT1:TAB 1
0022   0015 49           RTS
```

MUCOM-44   CROSS ASSEMBLER

STNO E ADRS OBJ.      SOURCE STATEMENTS

```
0023    0016 48          RT
0024    0017 00          NOP
0025    0018 26     TABT2:TAB 2
0026    0019 49          RTS
0027    001A 48          RT
0028    001B 00          NOP
0029    001C 27     TABT3:TAB 3
0030    001D 49          RTS
0031    001E 48          RT
0032    001F 00          NOP
0033    0020 38     MOS:L;MEMORY IS 0 ? IF SO THEN SKIP
0034    0021 0F          DEC
0035    0022 48          RT
0036    0023 49          RTS
0037    0024 38     MNOS:L;MEMORY IS NOT 0 ? IF SO THEN SKIP
0038    0025 C8          JCP DECT
0039    0026 00          NOP
0040    0027 00          NOP
0041    0028 38     MFS:L;MEMORY IS 0FH ? IF SO THEN SKIP
0042    0029 0D          INC
0043    002A 48          RT
0044    002B 49          RTS
0045    002C 38     MNFS:L;MEMORY IS NOT 0FH ? IF SO THEN SKIP
0046    002D C4          JCP INCT
0047    002E 00          NOP
0048    002F 00          NOP
0049    0030 58     TMBT0:TMB 0
0050    0031 49          RTS
0051    0032 48          RT
0052    0033 00          NOP
0053    0034 59     TMBT1:TMB 1
0054    0035 49          RTS
0055    0036 48          RT
0056    0037 00          NOP
0057    0038 5A     TMBT2:TMB 2
0058    0039 49          RTS
0059    003A 48          RT
0060    003B 00          NOP
0061    003C 5B     TMBT3:TMB 3
0062    003D 49          RTS
0063    003E 48          RT
0064                ;*****************************************
0065                    ;INITIAL ROUTIN
0066                ;*****************************************
0067    003F 8F     INTL:LDZ 0FH;CLEAR ALL RAM
0068    0040 90         LI 0
0069    0041 29         XM 1
0070    0042 90         LI 0
0071    0043 2D         XMD 1
0072    0044 C0         JCP INTL+1
0073    0045 82     INTL0:LDZ 2
0074    0046 51         TPB 1;REST SW?
0075    0047 A04B       JMP INTL1
0076    0049 A04F       JMP SCANN
0077    004B 87     INTL1:LDZ 7
0078    004C 92         LI 2
0079    004D 0E         OP
0080    004E C5         JCP INTL0
0081                ;*****************************************
0082                    ;MAIN ROUTIN
0083                ;*****************************************
```

MUCOM-44  CROSS ASSEMBLER

```
STNO  E ADRS OBJ.     SOURCE STATEMENTS 0084  004F  87        SCANN:LDZ 7
0085  0050  38          L
0086  0051  88          LDZ 8
0087  0052  79          SMB 1;COPY SOL IN MUTING
0088  0053  27          TAB 3
0089  0054  69          RMB 1
0090  0055  BC          CZP TMBT0;KICK?
0091  0056  69          RMB 1;MUTING
0092  0057  38          L
0093  0058  87          LDZ 7
0094  0059  7A          SMB 2;COPY SOL IN KIRIKAE
0095  005A  5B          TMB 3
0096  005B  6A          RMB 2
0097  005C  88          LDZ 8;OUTPUT ALL BUFFER
0098  005D  38        SSCAN:L
0099  005E  0E          OP
0100  005F  13          DED
0101  0060  16E3        CLI 3
0102  0062  DD          JCP SSCAN
0103  0063  5B          TMB 3;SYNCHRO LED?
0104  0064  90          LI 0
0105  0065  98          LI 8
0106  0066  0E          OP
0107  0067  82          LDZ 2;OMAZINAI
0108  0068  90          LI 0
0109  0069  0E          OP
0110                   ;PULSE COUNT
0111  006A  82          LDZ 2
0112  006B  BD          CZP TMBT1;REST SW?
0113  006C  A08C        JMP CLRM
0114  006E  03        MAIN0:TIT;REST SW OFF OR ON
0115  006F  A100        JMP TIMER
0116  0071  87          LDZ 7
0117  0072  BF          CZP TMBT3;SOL?
0118  0073  F5          JCP $+2
0119  0074  BC          CZP TMBT0;FOR?
0120  0075  A080        JMP SFOR
0121  0077  BD          CZP TMBT1;REV?
0122  0078  A084        JMP SREV
0123  007A  1516        LDI 16H
0124  007C  BC          CZP TMBT0;COUNT UP FLAG?
0125  007D  A091        JMP UP
0126  007F  C7          JCP DOWN
0127  0080  1516      SFOR:LDI 16H
0128  0082  78          SMB 0;COUNT UP FLAG
0129  0083  D1          JCP UP
0130  0084  1516      SREV:LDI 16H
0131  0086  68          RMB 0;COUNT UP FLAG
0132  0087  8D        DOWN:LDZ 0DH;COWNT DOWN 0DH ADRR.
0133  0088  B8        D:CZP MOS
0134  0089  D7          JCP MAIN1
0135  008A  3C          XMI 0
0136  008B  C8          JCP D
0137  008C  8D        CLRM:LDZ 0DH
0138  008D  90        CLR:LI 0;CLEAR PULSE COUNT MEMORY
0139  008E  3C          XMI 0
0140  008F  CD          JCP CLR
0141  0090  D8          JCP MAIN1+1
0142  0091  8D        UP:LDZ 0DH;COUNT UP 0DH ADRR.
0143  0092  BA        U:CZP MFS
0144  0093  D7          JCP MAIN1
```

MUCOM-44      CROSS ASSEMBLER

STNO E ADRS OBJ.         SOURCE STATEMENTS

```
0145   0094 3C          XMI 0
0146   0095 D2          JCP U
0147   0096 CC          JCP CLRM
0148   0097 02       MAIN1:S
0149   0098 1515       LDI 15H
0150   009A BE         CZP TMBT2;UP FLAG?
0151   009B A100       JMP TIMER
0152   009D A0CB       JMP AUTO0
0153                 ;
0154   009F 92       C65?:LI 2;130
0155   00A0 8D         LDZ 0DH
0156   00A1 0C         CM
0157   00A2 49         RTS
0158   00A3 98         LI 8
0159   00A4 8E         LDZ 0EH
0160   00A5 0C         CM
0161   00A6 49         RTS
0162   00A7 90         LI 0
0163   00A8 FC         JCP CMPRE
0164                 ;
0165   00A9 9A       C397?:LI 0AH;778
0166   00AA 8D         LDZ 0DH
0167   00AB 0C         CM
0168   00AC 49         RTS
0169   00AD 90         LI 0
0170   00AE 8E         LDZ 0EH
0171   00AF 0C         CM
0172   00B0 49         RTS
0173   00B1 93         LI 3
0174   00B2 FC         JCP CMPRE
0175                 ;
0176   00B3 9C       C554?:LI 0CH;1084
0177   00B4 8D         LDZ 0DH
0178   00B5 0C         CM
0179   00B6 49         RTS
0180   00B7 93         LI 3
0181   00B8 8E         LDZ 0EH
0182   00B9 0C         CM
0183   00BA 49         RTS
0184   00BB 94         LI 4
0185   00BC 8F       CMPRE:LDZ 0FH
0186   00BD 0C         CM
0187   00BE 49         RTS
0188   00BF 48         RT
0189                 ;
0190   00C0 9C       C578?:LI 0CH;1132
0191   00C1 8D         LDZ 0DH
0192   00C2 0C         CM
0193   00C3 49         RTS
0194   00C4 96         LI 6
0195   00C5 8E         LDZ 0EH
0196   00C6 0C         CM
0197   00C7 49         RTS
0198   00C8 94         LI 4
0199   00C9 A0BC       JMP CMPRE
0200                 ;
0201   00CB 59       AUTO0:TMB 1;AUTO IN FLAG?
0202   00CC E1         JCP AUTO3
0203   00CD 84         LDZ 4
0204   00CE BE         CZP TMBT2;REPEAT LED?
0205   00CF DC         JCP AUTO2
0206   00D0 59         TMB 1;SIZE 30 LED?
```

MUCOM-44   CROSS ASSEMBLER

```
STNO E ADRS OBJ.      SOURCE STATEMENTS 0207   00D1 D6          JCP AUTO1
0208   00D2 A89F        CAL C65?
0209   00D4 DE          JCP GAT1
0210   00D5 EF          JCP GTIMR
0211   00D6 58        AUTO1:TMB 0;SIZE 17 LED?
0212   00D7 E6          JCP AUTO5
0213   00D8 A8A9        CAL C397?
0214   00DA DE          JCP GAT1
0215   00DB EF          JCP GTIMR
0216   00DC AACD      AUTO2:CAL CIN?
0217   00DE A32C      GAT1:JMP AT1
0218   00E0 EF          JCP GTIMR
0219   00E1 84        AUTO3:LDZ 4
0220   00E2 BE          CZP TMBT2;REPEAT LED?
0221   00E3 F1          JCP AUTO7
0222   00E4 59        AUTO4:TMB 1;SIZE 30 LED?
0223   00E5 EA          JCP AUTO6
0224   00E6 A8B3      AUTO5:CAL C554?
0225   00E8 F3          JCP GPC0
0226   00E9 EF          JCP GTIMR
0227   00EA 58        AUTO6:TMB 0;SIZE 17 LED?
0228   00EB E6          JCP AUTO5
0229   00EC A8C0        CAL C578?
0230   00EE F3          JCP GPC0
0231   00EF A100      GTIMR:JMP TIMER
0232   00F1 AAD4      AUTO7:CAL COUT?
0233   00F3 A278      GPC0:JMP PC0
0234   00F5 84          LDZ 4
0235   00F6 E4          JCP AUTO4
0236   00F7             ORG 0100H
0237   0100 82        TIMER:LDZ 2
0238   0101 39          LM 1
0239   0102 24          TAB 0;NEW 50HZ
0240   0103 58          TMB 0;OLD 50HZ
0241   0104 D7          JCP RSTC
0242   0105 8C          LDZ 0CH;CLOCK H TO L
0243   0106 BA        TIM0:CZP MFS
0244   0107 B9          CZP MNOS
0245   0108 D3          JCP TIM;MEMORY IS 0FH OR 0
0246   0109 02          S;MEMORY IS OTHER, THEN COUNT DOWN
0247   010A B8          CZP MOS
0248   010B D3          JCP TIM
0249   010C 0F          DEC;IF M. HAS BEEN 0 JUST NOW,THEN STORE 0EH
0250   010D 29          XM 1
0251   010E B8          CZP MOS
0252   010F 02          S;IF UPPER NIEBLE IS NOT 0,THEN COUNT DOWN
0253   0110 39          LM 1
0254   0111 B2          CZP DECT
0255   0112 78          SMB 0;IF UPPER NIEBLE IS 0 OR 1,THEN STORE 0
0256   0113 13        TIM:DED      ;AND LOWER NIEBLE IS 0FH
0257   0114 16E9        CLI 9
0258   0116 C6          JCP TIM0
0259   0117 8C        RSTC:LDZ 0CH
0260   0118 BA          CZP MFS
0261   0119 E2          JCP RSTB
0262   011A 02          S
0263   011B 89          LDZ 9
0264   011C B9          CZP MNOS
0265   011D A316        JMP AMCUT
0266   011F B2          CZP DECT
0267   0120 A33C        JMP DOWN0
0268   0122 8B        RSTB:LDZ 0BH;SYNCHRO
```

MUCOM-44    CROSS ASSEMBLER

STNO E ADRS OBJ.        SOURCE STATEMENTS

```
0269   0123 BB        CZP MNFS
0270   0124 02        S
0271   0125 88        LDZ 8
0272   0126 B2        CZP DECT;TIME UP
0273   0127 6A        RMB 2;RESET SYNCHRO
0274   0128 8A        RSTA:LDZ 0AH;OVER DRIVE
0275   0129 BB        CZP MNFS
0276   012A 02        S
0277   012B 88        LDZ 8
0278   012C B2        CZP DECT;TIME UP
0279   012D 68        RMB 0;RESET KICK
0280                  ;*******************************************
0281                      ;READ OP SW AND ANALYSYS KEY
0282                  ;*******************************************
0283   012E 83        RDOS:LDZ 3;READ A,B,C,D PORT AND STORE OLD INPUT
0284   012F 32            IP
0285   0130 29            XM 1
0286   0131 02            S
0287   0132 39            LM 1
0288   0133 13            DED
0289   0134 EF            JCP RDOS+1
0290   0135 83        RDOS0:LDZ 3;OP SW CHANGE ?
0291   0136 39            LM 1
0292   0137 18            EXL
0293   0138 0F            DEC
0294   0139 FE            JCP SWCHG
0295   013A 13            DED
0296   013B F6            JCP RDOS0+1
0297   013C A04F          JMP SCANN
0298   013E A2EA      SWCHG:JMP PCH0
0299   0140 25            TAB 1;NEW?
0300   0141 59            TMB 1;OLD?
0301   0142 CF            JCP PACH0
0302   0143 87            LDZ 7;REST SW OFF./
0303   0144 BC            CZP TMBT0;FOR ARM M.?
0304   0145 CF            JCP PACH0
0305   0146 92            LI 2
0306   0147 0E            OP
0307   0148 82        PACH1:LDZ 2
0308   0149 51            TPB 1;REST SW?
0309   014A C8            JCP PACH1
0310   014B 79            SMB 1;REST SW
0311   014C 1512          LDI 12H
0312   014E 69            RMB 1;OLD REST SW
0313   014F 82        PACH0:LDZ 2
0314   0150 39            LM 1
0315   0151 59            TMB 1;OLD REST SW?
0316   0152 25            TAB 1;NEW REST SW?
0317   0153 EB            JCP SIZEE
0318   0154 87            LDZ 7;REST SW ON./
0319   0155 90            LI 0
0320   0156 02            S
0321   0157 82            LDZ 2
0322   0158 5B            TMB 3;DOOR CLOSE SW?
0323   0159 EB            JCP SIZEE
0324   015A 85            LDZ 5
0325   015B 6A            RMB 2;CUE LED
0326   015C 83            LDZ 3
0327   015D 6B            RMB 3;SYNCHRO LED
0328   015E 84            LDZ 4
0329   015F BE            CZP TMBT2;REPEAT LED?
0330   0160 E4            JCP PACH2
```

MUCOM-44    CROSS ASSEMBLER

| STNO | E ADRS | OBJ. | SOURCE STATEMENTS |
|---|---|---|---|
| 0331 | 0161 | 85 | LDZ 5 |
| 0332 | 0162 | 6B | RMB 3;PLAY/CUT LED |
| 0333 | 0163 | EB | JCP SIZEE |
| 0334 | 0164 | 85 | PACH2:LDZ 5 |
| 0335 | 0165 | 59 | TMB 1;REV LED? |
| 0336 | 0166 | A2C1 | JMP PLY30 |
| 0337 | 0168 | 6B | RMB 3;PLAY/CUT LED |
| 0338 | 0169 | 84 | LDZ 4 |
| 0339 | 016A | 6A | RMB 2;REPEAT LED |
| 0340 | 016B | 83 | SIZEE:LDZ 3 |
| 0341 | 016C | 58 | TMB 0;17 CM SIZE? |
| 0342 | 016D | BD | CZP TMBT1;30 CM SIZE? |
| 0343 | 016E | F3 | JCP SIZE0 |
| 0344 | 016F | 84 | LDZ 4;L&L |
| 0345 | 0170 | 68 | RMB 0;17 CM LED |
| 0346 | 0171 | 79 | SMB 1;30 CM LED |
| 0347 | 0172 | FC | JCP SPED |
| 0348 | 0173 | 83 | SIZE0:LDZ 3;OTHER |
| 0349 | 0174 | 38 | L |
| 0350 | 0175 | 84 | LDZ 4 |
| 0351 | 0176 | 68 | RMB 0;COMPLEMENT SIZE 17 LED |
| 0352 | 0177 | 24 | TAB 0 |
| 0353 | 0178 | 78 | SMB 0 |
| 0354 | 0179 | 69 | RMB 1;COMPLEMENT SIZE 30 LED |
| 0355 | 017A | 25 | TAB 1 |
| 0356 | 017B | 79 | SMB 1 |
| 0357 | 017C | 82 | SPED:LDZ 2 |
| 0358 | 017D | BF | CZP TMBT3;DOOR CLOSE SW? |
| 0359 | 017E | A183 | JMP SPED0 |
| 0360 | 0180 | 84 | LDZ 4 |
| 0361 | 0181 | 68 | RMB 0;SISE 17 LED |
| 0362 | 0182 | 69 | RMB 1;SIZE3 30 LED |
| 0363 | 0183 | 82 | SPED0:LDZ 2 |
| 0364 | 0184 | 39 | LM 1 |
| 0365 | 0185 | 5B | TMB 3;OLD? |
| 0366 | 0186 | 27 | TAB 3;NEW? |
| 0367 | 0187 | CD | JCP SPED1 |
| 0368 | 0188 | 84 | LDZ 4;DOOR CLOSE SW ON |
| 0369 | 0189 | BC | CZP TMBT0;SISE 17 LED? |
| 0370 | 018A | 7B | SMB 3;45 LED |
| 0371 | 018B | BD | CZP TMBT1;SIZE 30 LED? |
| 0372 | 018C | 6B | RMB 3;45 LED |
| 0373 | 018D | 82 | SPED1:LDZ 2 |
| 0374 | 018E | 5B | TMB 3;DOOR CLOSE SW? |
| 0375 | 018F | DA | JCP RPEAT |
| 0376 | 0190 | 80 | LDZ 0 |
| 0377 | 0191 | 39 | LM 1 |
| 0378 | 0192 | 5B | TMB 3;OLD SPEED SW? |
| 0379 | 0193 | 27 | TAB 3;SPEED SW? |
| 0380 | 0194 | DA | JCP RPEAT |
| 0381 | 0195 | 84 | LDZ 4;SPEED SW ON ! |
| 0382 | 0196 | 38 | L |
| 0383 | 0197 | 6B | RMB 3;COMPLEMENT 45 LED |
| 0384 | 0198 | 27 | TAB 3 |
| 0385 | 0199 | 7B | SMB 3 |
| 0386 | 019A | 87 | RPEAT:LDZ 7 |
| 0387 | 019B | 04 | TC;REPEAT INHIBIT? |
| 0388 | 019C | 5B | TMB 3;SOL? |
| 0389 | 019D | F2 | JCP GDOOR |
| 0390 | 019E | 80 | LDZ 0 |
| 0391 | 019F | 39 | LM 1 |
| 0392 | 01A0 | 5A | TMB 2;OLD? |

MUCOM-44   CROSS ASSEMBLER

STNO E ADRS OBJ.      SOURCE STATEMENTS

```
0393    01A1 26             TAB 2;NEW?
0394    01A2 F2             JCP GDOOR
0395    01A3 84             LDZ 4;REPEAT SW ON!
0396    01A4 BE             CZP TMBT2;REPEAT LED?
0397    01A5 F4             JCP RPT0
0398    01A6 7A             SMB 2;REPEAT LED
0399    01A7 8D             LDZ 0DH;STORE PULSE COUNT M. IN UPPER NIEBLE
0400    01A8 39       MEMO:LM 1
0401    01A9 3D             XMI 1
0402    01AA E8             JCP MEMO
0403    01AB 1517     PCLR:LDI 17H
0404    01AD 90             LI 0
0405    01AE 3C             XMI 0
0406    01AF 16EA           CLI 0AH
0407    01B1 EC             JCP PCLR+1
0408    01B2 A361     GDOOR:JMP DOOR
0409    01B4 1B       RPT0:STC;REPEAT INHIBIT
0410    01B5 8D             LDZ 0DH;REPEAT LED ON
0411    01B6 38             L;STORE PULSE COUNT M. IN UPPER NEIBLE
0412    01B7 1517           LDI 17H
0413    01B9 02             S
0414    01BA 8E             LDZ 0EH
0415    01BB 38             L
0416    01BC 1518           LDI 18H
0417    01BE 02             S
0418    01BF 8F             LDZ 0FH
0419    01C0 38             L
0420    01C1 1519           LDI 19H
0421    01C3 02             S
0422    01C4 A278           JMP PC0
0423    01C6 82       CUT?:LDZ 2
0424    01C7 1515           LDI 15H
0425    01C9 BC             CZP TMBT0;CUT FLAG?
0426    01CA A04F           JMP SCANN
0427    01CC 80       SYNC1:LDZ 0
0428    01CD 39             LM 1
0429    01CE 58             TMB 0;OLD?
0430    01CF 24             TAB 0;NEW?
0431    01D0 D6             JCP FOR
0432    01D1 83             LDZ 3;SYNCHRO SW ON!
0433    01D2 38             L
0434    01D3 6B             RMB 3;COMPLEMENT SYNCHRO LED
0435    01D4 27             TAB 3
0436    01D5 7B             SMB 3
0437    01D6 1515     FOR:LDI 15H
0438    01D8 BD             CZP TMBT1;AUTO IN FLAG?
0439    01D9 DE             JCP GCUE
0440    01DA 82             LDZ 2
0441    01DB 5A             TMB 2;DOOR OPEN SW ON?
0442    01DC BF             CZP TMBT3;DOOR CLOSE SW ON?
0443    01DD E0             JCP FR
0444    01DE A222     GCUE:JMP CUE;BOTH OFF
0445    01E0 86       FR:LDZ 6;DOOR OPEN OR CLOSE
0446    01E1 5A             TMB 2;OPEN DOOR M.?
0447    01E2 BF             CZP TMBT3;CLOSE DOOR M.?
0448    01E3 EF             JCP FOR0;EITHER ON
0449    01E4 81             LDZ 1;BOTH OFF
0450    01E5 38             L
0451    01E6 85             LDZ 5;COPY FOR SW IN FOR LED
0452    01E7 78             SMB 0
0453    01E8 24             TAB 0
```

MUCOM-44    CROSS ASSEMBLER                                    PAGE = 0009

STNO E ADRS OBJ.      SOURCE STATEMENTS

```
0454   01E9 68           RMB 0
0455   01EA 82           LDZ 2
0456   01EB 39           LM 1
0457   01EC 59           TMB 1;OLD REST SW ?
0458   01ED 25           TAB 1;REST SW?
0459   01EE F1           JCP REV
0460   01EF 85       FOR0:LDZ 5;REST SW ON!
0461   01F0 68           RMB 0;FOR LED
0462   01F1 81       REV:LDZ 1
0463   01F2 38           L
0464   01F3 85           LDZ 5;COPY REV SW IN REV LED
0465   01F4 79           SMB 1;REV LED
0466   01F5 25           TAB 1;REV SW?
0467   01F6 69           RMB 1;REV LED?
0468   01F7 82           LDZ 2
0469   01F8 59           TMB 1;REST SW?
0470   01F9 FE           JCP GREV0
0471   01FA 85           LDZ 5;REST SW ON
0472   01FB 69           RMB 1;REV LED
0473   01FC 87           LDZ 7
0474   01FD 6B           RMB 3;SOL
0475   01FE A200     GREV0:JMP REV0
0476   0200             ORG 0200H
0477   0200 1515    REV0:LDI 15H
0478   0202 BE           CZP TMBT2;UP FLAG?
0479   0203 E2           JCP CUE
0480   0204 85           LDZ 5;COPY FOR,REV, LED IN FOR,REV, ARM
0481   0205 38           L
0482   0206 87           LDZ 7
0483   0207 78           SMB 0
0484   0208 24           TAB 0
0485   0209 68           RMB 0
0486   020A 79           SMB 1
0487   020B 25           TAB 1
0488   020C 69           RMB 1
0489   020D BC           CZP TMBT0;FOR?
0490   020E 59           TMB 1;REV?
0491   020F D2           JCP CANCL
0492   0210 68           RMB 0
0493   0211 69           RMB 1
0494   0212 81       CANCL:LDZ 1
0495   0213 39           LM 1
0496   0214 58           TMB 0;OLD?
0497   0215 24           TAB 0;NEW?
0498   0216 D8           JCP REV1
0499   0217 DB           JCP ON;FOR SW ON!
0500   0218 59       REV1:TMB 1;OLD?
0501   0219 25           TAB 1;NEW?
0502   021A E2           JCP CUE
0503   021B 87       ON:LDZ 7;REV SW ON!
0504   021C 5B           TMB 3;SOL?
0505   021D E2           JCP CUE
0506   021E 90           LI 0
0507   021F 02           S
0508   0220 A308         JMP CT00
0509   0222 81       CUE:LDZ 1
0510   0223 39           LM 1
0511   0224 5A           TMB 2;OLD CUE SW?
0512   0225 26           TAB 2;CUE SW?
0513   0226 FB           JCP GCUE0
0514   0227 85           LDZ 5;CUE SW ON!
0515   0228 38           L
```

MUCOM-44    CROSS ASSEMBLER

STNO E ADRS OBJ.        SOURCE STATEMENTS

```
0516    0229 6A              RMB 2;COMPLEMENT CUE LED
0517    022A 26              TAB 2
0518    022B 7A              SMB 2
0519    022C 87              LDZ 7
0520    022D BF              CZP TMBT3;SOL?
0521    022E A300            JMP CUT0
0522    0230 82              LDZ 2
0523    0231 BD              CZP TMBT1;REST SW?
0524    0232 FB              JCP GCUE0
0525    0233 87              LDZ 7
0526    0234 58              TMB 0;FOR ARM?
0527    0235 BD              CZP TMBT1;REV ARM?
0528    0236 FB              JCP GCUE0
0529    0237 82              LDZ 2
0530    0238 5B              TMB 3;DOOR CLOSE SW?
0531    0239 FB              JCP GCUE0
0532    023A 26              TAB 2;CUE LED?
0533    023B A245       GCUE0:JMP CUE0
0534    023D 87              LDZ 7
0535    023E AB4A            CAL KICK
0536    0240 83              LDZ 3
0537    0241 5B              TMB 3;SYNCHRO LED?
0538    0242 C5              JCP CUE0
0539    0243 AB52            CAL SYNCD
0540    0245 85         CUE0:LDZ 5;SW NOT ON FOR OR REV
0541    0246 BC              CZP TMBT0;FOR LED?
0542    0247 CA              JCP CUE04
0543    0248 59              TMB 1;REV LED?
0544    0249 D1              JCP CUE03
0545    024A 82         CUE04:LDZ 2
0546    024B 5B              TMB 3;DOOR CLOSE SW?
0547    024C CF              JCP CU04
0548    024D 85              LDZ 5
0549    024E 7A              SMB 2;CUE LED
0550    024F 87          CU04:LDZ 7
0551    0250 6B              RMB 3;SOL
0552    0251 82         CUE03:LDZ 2
0553    0252 BF              CZP TMBT3;DOOR CLOSE SW?
0554    0253 D6              JCP PLAYC
0555    0254 87              LDZ 7
0556    0255 6B              RMB 3;SOL
0557    0256 82         PLAYC:LDZ 2;ALWAYS
0558    0257 BF              CZP TMBT3;DOOR CLOSE SW?
0559    0258 E1              JCP PLYC0
0560    0259 85              LDZ 5
0561    025A 6B              RMB 3;PLAY/CUT LED
0562    025B 82              LDZ 2
0563    025C 5A              TMB 2;DOOR OPEN SW?
0564    025D F1              JCP GSCAN
0565    025E 59              TMB 1;REST SW? DOOR OPEN
0566    025F ED              JCP PLYC1
0567    0260 E2              JCP $+2
0568    0261 BD         PLYC0:CZP TMBT1;REST SW? DOOR CLOSE
0569    0262 A29C            JMP PLAY0
0570    0264 84              LDZ 4;PHONO M. DOOR CLOSE NREST
0571    0265 38              L
0572    0266 86              LDZ 6
0573    0267 68              RMB 0;COMPLEMENT 45 LED IN 33 PHONO M.
0574    0268 27              TAB 3
0575    0269 78              SMB 0
0576    026A 79              SMB 1;COPY 45 LED IN 45 PHONO M.
```

MUCOM-44    CROSS ASSEMBLER

STNO E ADRS OBJ.    SOURCE STATEMENTS

```
0577  026B 27          TAB 3
0578  026C 69          RMB 1
0579  026D 81     PLYC1:LDZ 1;DR OPEN  DR CLOSE NREST
0580  026E 39          LM 1
0581  026F 5B          TMB 3;OLD PLAY/CUT SW ?
0582  0270 27          TAB 3;NEW ?
0583  0271 A04F   GSCAN:JMP SCANN
0584  0273 82     PLAY2:LDZ 2;PLAY/CUT SW ON!
0585  0274 5B          TMB 3;DOOR CLOSE SW?
0586  0275 A288        JMP PC4
0587  0277 FB          JCP PC1
0588  0278 82     PC0:LDZ 2
0589  0279 BF          CZP TMBT3;DOOR CLOSE SW?
0590  027A FD          JCP PC3
0591  027B 84     PC1:LDZ 4
0592  027C 6A          RMB 2;REPEAT LED
0593  027D 82     PC3:LDZ 2
0594  027E BF          CZP TMBT3;DOOR CLOSE SW?
0595  027F C4          JCP PC30
0596  0280 85          LDZ 5
0597  0281 68          RMB 0;FOR LED
0598  0282 69          RMB 1;REV LED
0599  0283 CD          JCP PC5
0600  0284 85     PC30:LDZ 5
0601  0285 90          LI 0
0602  0286 02          S
0603  0287 CD          JCP PC5
0604  0288 1515   PC4:LDI 15H
0605  028A 7B          SMB 3;AUTO PLAY FLAG
0606  028B A27D        JMP PC3
0607  028D 82     PC5:LDZ 2
0608  028E 38          L
0609  028F 1515        LDI 15H
0610  0291 69          RMB 1;AUTO IN FLAG
0611  0292 78          SMB 0;CUT FLAG
0612  0293 B5          CZP TABT1;REST SW? NEED
0613  0294 68          RMB 0;CUT FLAG
0614  0295 BE          CZP TMBT2;UP FLAG?
0615  0296 DA          JCP GCUT0
0616  0297 8C          LDZ 0CH
0617  0298 90          LI 0
0618  0299 02          S
0619  029A A300   GCUT0:JMP CUT0
0620  029C 86     PLAY0:LDZ 6;STOP PHONO MORTOR,DOOR FULL OPEN OR CLO
0621  029D 68          RMB 0;33 PHONO M. DOOR OPEN REST OR DOOR CLOSE RE
0622  029E 69          RMB 1;45 PHONO M.
0623  029F 82          LDZ 2
0624  02A0 5B          TMB 3;DOOR CLOSE SW?
0625  02A1 A26D        JMP PLYC1
0626  02A3 1515        LDI 15H;DOOR CLOSE REST
0627  02A5 5B          TMB 3;ATO PLAY FLAG?
0628  02A6 E9          JCP PLY00
0629  02A7 6B          RMB 3;AUTO PLAY FLAG
0630  02A8 EE          JCP PLY01
0631  02A9 81     PLY00:LDZ 1;REST SW ON DOOR CLOSE REST
0632  02AA 39          LM 1
0633  02AB 5B          TMB 3;OLD PLAY/CUT SW ON ?
0634  02AC 27          TAB 3;NEW ?
0635  02AD FB          JCP TSCAN
0636  02AE 85     PLY01:LDZ 5;PLAY/CUT SW ON!
0637  02AF 5B          TMB 3;PLAY/CUT LED?
```

MUCOM-44    CROSS ASSEMBLER

STNO E ADRS OBJ.    SOURCE STATEMENTS

```
0638    02B0 FA         JCP PLY05
0639    02B1 85      PLY03:LDZ 5
0640    02B2 90         LI 0;OFF ALL LED
0641    02B3 02         S
0642    02B4 84         LDZ 4
0643    02B5 6A         RMB 2;REPEAT LED
0644    02B6 83         LDZ 3
0645    02B7 6B         RMB 3;SYNCHRO LED
0646    02B8 A2C8       JMP PLAY1
0647    02BA BC      PLY05:CZP TMBT0;FOR LED?
0648    02BB A04F       TSCAN:JMP SCANN
0649    02BD 86         LDZ 6
0650    02BE BE         CZP TMBT2;OPEN DOOR M.?
0651    02BF A2B1       JMP PLY03
0652    02C1 85      PLY30:LDZ 5
0653    02C2 7B      PLAY3:SMB 3;PLAY/CUT LED
0654    02C3 1515       LDI 15H
0655    02C5 79         SMB 1;AUTO IN FLAG
0656    02C6 A329       JMP ATLDI
0657    02C8 1515    PLAY1:LDI 15H;DOOR CLOSE REST,PLAY LED ON AND P/C
0658    02CA 69         RMB 1;AUTO IN FLAG
0659    02CB A04F       JMP SCANN
0660                 ;
0661    02CD 8D      CIN?:LDZ 0DH
0662    02CE 39         LM 1
0663    02CF 0C         CM
0664    02D0 49         RTS
0665    02D1 33         IND
0666    02D2 CE         JCP CIN?+1
0667    02D3 48         RT
0668                 ;
0669    02D4 1517    COUT?:LDI 17H
0670    02D6 38         L
0671    02D7 8D         LDZ 0DH
0672    02D8 0C         CM
0673    02D9 49         RTS
0674    02DA 1518       LDI 18H
0675    02DC 38         L
0676    02DD 8E         LDZ 0EH
0677    02DE 0C         CM
0678    02DF 49         RTS
0679    02E0 1519       LDI 19H
0680    02E2 38         L
0681    02E3 8F         LDZ 0FH
0682    02E4 0C         CM
0683    02E5 49         RTS
0684    02E6 82         LDZ 2
0685    02E7 59         TMB 1;REST SW?
0686    02E8 48         RT
0687    02E9 49         RTS
0688    02EA 84      PCH0:LDZ 4
0689    02EB 5A         TMB 2;REPEAT LED?
0690    02EC 0B         CLC
0691    02ED 82         LDZ 2
0692    02EE 39         LM 1
0693    02EF A140       JMP SWCHG+2
0694                 ;
0695    02F1         ORG 0300H
0696                 ;*****************************************
0697                 ;    AMC ROUTIN
0698                 ;*****************************************
0699    0300 87         CUT0:LDZ 7;CUT/
```

MUCOM-44 CROSS ASSEMBLER

| STNO | E ADRS OBJ. | SOURCE STATEMENTS |
|---|---|---|
| 0700 | 0301 BF | CZP TMBT3;SOL? |
| 0701 | 0302 C8 | JCP CT00 |
| 0702 | 0303 1515 | LDI 15H |
| 0703 | 0305 5A | TMB 2;UP FLAG? |
| 0704 | 0306 D6 | JCP AMCUT |
| 0705 | 0307 FE | JCP JSCAN |
| 0706 | 0308 6B | CT00:RMB 3;SOL ON |
| 0707 | 0309 83 | LDZ 3 |
| 0708 | 030A 5B | TMB 3;SYNCHRO LED? |
| 0709 | 030B CE | JCP CT11 |
| 0710 | 030C AB52 | CAL SYNCD |
| 0711 | 030E 90 | CT11:LI 0;RESTART PARA. |
| 0712 | 030F 1515 | LDI 15H |
| 0713 | 0311 7A | SMB 2;UP FLAG |
| 0714 | 0312 AB5B | CAL DELAY |
| 0715 | 0314 95 | LI 5 |
| 0716 | 0315 FA | JCP SJSCN |
| 0717 | 0316 1515 | AMCUT:LDI 15H |
| 0718 | 0318 58 | TMB 0;CUT FLAG? |
| 0719 | 0319 E5 | JCP AMCT0 |
| 0720 | 031A 87 | LDZ 7 |
| 0721 | 031B 79 | SMB 1;REV ARM |
| 0722 | 031C 68 | RMB 0;FOR ARM |
| 0723 | 031D 86 | LDZ 6 |
| 0724 | 031E 68 | RMB 0;33 |
| 0725 | 031F 69 | RMB 1;45 |
| 0726 | 0320 82 | LDZ 2 |
| 0727 | 0321 5B | TMB 3;DOOR CLOSE SW? |
| 0728 | 0322 E5 | JCP AMCT0 |
| 0729 | 0323 83 | LDZ 3 |
| 0730 | 0324 6B | RMB 3;SYNCHRO LED |
| 0731 | 0325 1515 | AMCT0:LDI 15H |
| 0732 | 0327 6A | RMB 2;UP FLAG |
| 0733 | 0328 FE | JCP JSCAN |
| 0734 | 0329 87 | ATLDI:LDZ 7;AUTO IN |
| 0735 | 032A 78 | SMB 0;FOR ARM |
| 0736 | 032B FE | JCP JSCAN |
| 0737 | 032C 1515 | AT1:LDI 15H |
| 0738 | 032E 69 | RMB 1;AUTO IN FLAG |
| 0739 | 032F 81 | LDZ 1 |
| 0740 | 0330 58 | TMB 0;FOR SW? |
| 0741 | 0331 BD | CZP TMBT1;REV SW? |
| 0742 | 0332 FE | JCP JSCAN |
| 0743 | 0333 87 | LDZ 7 |
| 0744 | 0334 90 | LI 0 |
| 0745 | 0335 02 | S |
| 0746 | 0336 91 | LI 1 |
| 0747 | 0337 AB5B | CAL DELAY |
| 0748 | 0339 92 | LI 2 |
| 0749 | 033A 02 | SJSCN:S |
| 0750 | 033B FE | JCP JSCAN |
| 0751 | 033C 85 | DOWN0:LDZ 5 |
| 0752 | 033D BE | CZP TMBT2;CUE LED? |
| 0753 | 033E A04F | JSCAN:JMP SCANN |
| 0754 | 0340 87 | LDZ 7 |
| 0755 | 0341 AB4A | CAL KICK |
| 0756 | 0343 83 | LDZ 3 |
| 0757 | 0344 5B | TMB 3;SYNCHRO LED? |
| 0758 | 0345 C8 | JCP LSCAN |
| 0759 | 0346 AB52 | CAL SYNCD |
| 0760 | 0348 A04F | LSCAN:JMP SCANN |
| 0761 | 034A 7B | KICK:SMB 3;SOL |

MUCOM-44    CROSS ASSEMBLER

STNO E ADRS OBJ.    SOURCE STATEMENTS

```
0762    034B 88         LDZ 8
0763    034C 78         SMB 0;KICK
0764    034D 99         LI 9;KICK DELAY
0765    034E 8A         LDZ 0AH
0766    034F 29         XM 1
0767    0350 9B         LI 0BH
0768    0351 D9         JCP RTURN
0769    0352 6B     SYNCD:RMB 3;SYNCHRO LED
0770    0353 88         LDZ 8
0771    0354 7A         SMB 2;SYNCHRO
0772    0355 95         LI 5;SYNCHRO DELAY
0773    0356 8B         LDZ 0BH
0774    0357 29         XM 1
0775    0358 90         LI 0
0776    0359 02     RTURN:S
0777    035A 48         RT
0778    035B 89     DELAY:LDZ 9;RESTART PARA. ARM  DELAY
0779    035C 02         S
0780    035D 9E         LI 0EH
0781    035E 8C         LDZ 0CH
0782    035F 29         XM 1
0783    0360 48         RT
0784    0361 82     DOOR:LDZ 2
0785    0362 38         L
0786    0363 1515       LDI 15H
0787    0365 B5         CZP TABT1;REST SW?
0788    0366 68         RMB 0;CUT FLAG
0789    0367 B7         CZP TABT3;DOOR CLOSE SW?
0790    0368 EE         JCP DOOR0
0791    0369 86         LDZ 6
0792    036A 68         RMB 0;33
0793    036B 69         RMB 1;45 IF DOOR OPEN THEN STOP PHONO MORTOR AND
0794    036C 87         LDZ 7
0795    036D 6B         RMB 3;SOL
0796    036E 80     DOOR0:LDZ 0
0797    036F 39         LM 1
0798    0370 59         TMB 1;OLD?
0799    0371 25         TAB 1;NEW?
0800    0372 A39B       JMP DOOR1
0801    0374 82         LDZ 2;DOOR SW ON!
0802    0375 5B         TMB 3;DOOR CLOSE SW?
0803    0376 FF         JCP DOR0
0804    0377 59         TMB 1;REST SW?
0805    0378 FB         JCP DDR
0806    0379 83         LDZ 3
0807    037A 6B         RMB 3;SYNCHRO LED
0808    037B 84     DDR:LDZ 4
0809    037C 6A         RMB 2;REPEAT LED
0810    037D 85         LDZ 5
0811    037E 6A         RMB 2;CUE LED
0812    037F 1515   DOR0:LDI 15H;DOOR SW ON!
0813    0381 6B         RMB 3;AUTO PLAY FLAG
0814    0382 13         DED
0815    0383 38         L
0816    0384 68         RMB 0;COMPLEMENT DOOR OPEN FLAG
0817    0385 24         TAB 0
0818    0386 78         SMB 0
0819    0387 69         RMB 1;COMPLEMENT DOOR CLOSE FLAG
0820    0388 25         TAB 1
0821    0389 79         SMB 1
0822    038A 82         LDZ 2
```

MUCOM-44    CROSS ASSEMBLER

STNO E ADRS OBJ.        SOURCE STATEMENTS

```
0823    038B 38                  L
0824    038C 1514               LDI 14H
0825    038E 26                 TAB 2;DOOR OPEN SW?
0826    038F D2                 JCP DR1
0827    0390 68                 RMB 0;DOOR OPEN FLAG
0828    0391 D3                 JCP DR0
0829    0392 69         DR1:RMB 1;DOOR CLOSE FLAG
0830    0393 B5         DR0:CZP TABT1;REST SW?
0831    0394 E5                 JCP DOOR2;REST SW ON AND DOOR SW ON!
0832    0395 1515               LDI 15H;REST SW OFF AND DOOR SW ON!
0833    0397 58                 TMB 0;CUT FLAG?
0834    0398 A27B              JMP PC1;CUT!
0835    039A E3                 JCP HSCAN
0836    039B 82         DOOR1:LDZ 2
0837    039C BD                 CZP TMBT1;REST SW?
0838    039D E5                 JCP DOOR2
0839    039E 1515               LDI 15H;REST SW OFF
0840    03A0 58                 TMB 0;CUT FLAG?
0841    03A1 A1C6              JMP CUT?
0842    03A3 A04F       HSCAN:JMP SCANN
0843    03A5 1515       DOOR2:LDI 15H;REST SW ON
0844    03A7 5B                 TMB 3;AUTO PLAY FLAG?
0845    03A8 EB                 JCP DR3
0846    03A9 13                 DED
0847    03AA 79                 SMB 1;DOOR CLOSE FLAG
0848    03AB 1514       DR3:LDI 14H;REST SW ON
0849    03AD 38                  L
0850    03AE 86                 LDZ 6
0851    03AF 7A                 SMB 2;COPY DOOR OPEN FLAG IN OPEN DOOR MORTOR
0852    03B0 24                 TAB 0
0853    03B1 6A                 RMB 2
0854    03B2 7B                 SMB 3;COPY DOOR CLOSE FLAG IN CLOSE DOOR MORTOR
0855    03B3 25                 TAB 1
0856    03B4 6B                 RMB 3
0857    03B5 82                 LDZ 2
0858    03B6 5A                 TMB 2;DOOR OPEN SW?
0859    03B7 BF                 CZP TMBT3;DOOR CLOSE SW?
0860    03B8 FF                 JCP DOOR3
0861    03B9 1514               LDI 14H
0862    03BB BC                 CZP TMBT0;DOOR OPEN FLAG?
0863    03BC FF                 JCP DOOR3
0864    03BD 86                 LDZ 6
0865    03BE 7B                 SMB 3;CLOSE DOOR MORTOR
0866    03BF 86         DOOR3:LDZ 6;IF PLAY AND DOOR SW ON, THEN CUT
0867    03C0 38                  L
0868    03C1 85                 LDZ 5
0869    03C2 BF                 CZP TMBT3;PLAY/CUT LED?
0870    03C3 26                 TAB 2;OPEN DOOR M.
0871    03C4 C7                 JCP DOR03
0872    03C5 A2B1              JMP PLY03
0873    03C7 83         DOR03:LDZ 3
0874    03C8 5A                 TMB 2;PROTECTOR?
0875    03C9 D6                 JCP DOOR4
0876    03CA 1514               LDI 14H
0877    03CC 69                 RMB 1;DOOR CLOSE FLAG
0878    03CD 33                 IND
0879    03CE 6B                 RMB 3;AUTO PLAY FLAG
0880    03CF 82                 LDZ 2
0881    03D0 38                  L
0882    03D1 86                 LDZ 6
0883    03D2 6B                 RMB 3;CLOSE DOOR MORTOR
```

MUCOM-44    CROSS ASSEMBLER

```
STNO E ADRS OBJ.       SOURCE STATEMENTS
0884   03D3 6A           RMB 2;OPEN DOOR MORTOR
0885   03D4 26           TAB 2;DOOR OPEN SW?
0886   03D5 7A           SMB 2;OPEN DOOR MORTOR
0887   03D6 82         DOOR4:LDZ 2
0888   03D7 39           LM 1
0889   03D8 5A           TMB 2;OLD?
0890   03D9 26           TAB 2;NEW?
0891   03DA DC           JCP DOOR5
0892   03DB DF           JCP DOOR6;DOOR OPEN SW ON!
0893   03DC 5B         DOOR5:TMB 3;OLD?
0894   03DD 27           TAB 3;NEW?
0895   03DE E6           JCP GCUT?
0896   03DF 86         DOOR6:LDZ 6;DOOR CLOSE SW ON!
0897   03E0 6A           RMB 2;STOP DOOR MORTOR
0898   03E1 6B           RMB 3
0899   03E2 1514         LDI 14H
0900   03E4 68           RMB 0;DOOR OPEN FLAG
0901   03E5 69           RMB 1;DOOR CLOSE FLAG
0902   03E6 A1C6       GCUT?:JMP CUT?
0903   0000           END
ERROR = 0000
```

What is claimed is:

1. A pickup tonearm drive system applicable to a record disc player comprising:

drive means for the pickup tonearm;

a pulse generator for generating a pulse at every predetermined distance of movement of a pickup tonearm;

a counter for obtaining a count representative of the current position of the tonearm compared to a rest position by upcounting the pulses from said generator in a first-direction movement of the tonearm and downcounting the pulses from said generator in a second direction movement of the tone arm which is reverse in direction to the first direction;

a repeat key for issuing a repeat signal upon the actuation thereon; and a processor and memory programmed by the steps of:

in response to the repeat signal first issued from said repeat key after the playback operation of the tonearm has started, memorizing a first count of said counter as a repeat start position information, in response to the repeat signal secondly issued from said repeat key, (a) memorizing a second count of said counter as a repeat end position information and also controlling the tonearm to terminate the playback operation, and (b) controlling the tonearm to repeatedly perform a playback operation between the positions represented by said first and second counts by actuating the drive means to drive the tonearm according to comparison of the count of said counter with the memorized first and second counts.

* * * * *